United States Patent [19]
Laporte et al.

[11] Patent Number: 6,031,449
[45] Date of Patent: Feb. 29, 2000

[54] METHOD OF PROTECTION AGAINST IMPACTS BETWEEN TWO VEHICLES BY AT LEAST ON INFLATABLE MEMBER AND DEVICE FOR IMPLEMENTING IT

[75] Inventors: Jean-Jacques Laporte, La Rochelle; Eric Tassily, L'Houmeau; Frédéric Muttin, La Rochelle, all of France

[73] Assignee: GEC Alsthom Transport SA, Paris, France

[21] Appl. No.: 09/102,004

[22] Filed: Jun. 22, 1998

[30] Foreign Application Priority Data

Jun. 23, 1997 [FR] France ................... 97 07 770

[51] Int. Cl.$^7$ ........................................... B60Q 1/00
[52] U.S. Cl. ..................... 340/436; 340/435; 340/903; 701/45; 280/728.1
[58] Field of Search ....................... 340/436, 435, 340/903; 701/45, 46, 47; 280/728.1, 728.2, 735, 743.1; 180/232

[56] References Cited

U.S. PATENT DOCUMENTS 3,760,414  9/1973  Nicolson .................... 342/21
5,748,477  5/1998  Katoh ...................... 364/461

FOREIGN PATENT DOCUMENTS 2139187      2/1973  Germany.
44 26090 A1  7/1995  Germany.

*Primary Examiner*—Daryl Pope
*Attorney, Agent, or Firm*—Sughrue, Mion, Zinn, Macpeak & Seas, PLLC

[57] ABSTRACT

A method of protection against impacts between two vehicles by means of an member, in which each of the vehicles includes an inflatable member adapted to be deployed under control of a signal commanding opening of the inflatable member, the method including the steps of detecting from a first vehicle an impending collision of the two vehicles, transmitting from the first vehicle a first signal commanding opening of the inflatable member associated with the first vehicle; receiving the first signal commanding opening of the inflatable member associated with the first vehicle, by the second vehicle, and transmitting to the second vehicle a second signal commanding opening of the inflatable member associated with the second vehicle. A device for implementing the above method is also disclosed.

7 Claims, 1 Drawing Sheet

METHOD OF PROTECTION AGAINST IMPACTS BETWEEN TWO VEHICLES BY AT LEAST ON INFLATABLE MEMBER AND DEVICE FOR IMPLEMENTING IT

The present invention concerns inflatable members for protection against impacts between two vehicles in general and a method of protection against impacts between two vehicles by means of at least one inflatable member and a device for implementing it in particular.

BACKGROUND OF THE INVENTION

The method of the invention of protection against impacts between two vehicles by means of at least one inflatable member preferably applies to the railroad art.

Here "inflatable member" means any member of the inflatable bag type more usually called an air-bag in the automotive art.

Document GB 2 020 234 shows the use of an inflatable member at the front of a railroad vehicle.

Gas generators are used to open the inflatable members.

SUMMARY OF THE INVENTION

An aim of the invention is a method of protection against impacts between two vehicles by means of at least one inflatable member and a device for implementing it integrally protecting the parts of the vehicle liable to come into contact in the event of an impact.

In other words, an aim of the method of the invention of protection against impacts between two vehicles by means of at least one inflatable member, is to reduce the level of acceleration so as to reduce damage to the structure of the vehicles.

An advantage of the method of the invention of protection against impacts between two vehicles by means of at least one inflatable member and of the device of the invention for implementing it is to reduce the cost of repairing the structures of damaged vehicles.

Another advantage of the method of the invention of protection against impacts between two vehicles by means of at least one inflatable member and of the device of the invention for implementing it is to provide a simple system.

Another advantage of the method of the invention of protection against impacts between two vehicles by means of at least one inflatable member and of the device of the invention for implementing it is to anticipate the collision.

Other aims, features and advantages of the invention will become apparent upon reading the description of the preferred embodiment of the method of protection against impacts between two vehicles by means of at least one inflatable member given with reference to the drawing in which FIGS. 1A through 1E illustrate the method of the invention of protection against impacts between two vehicles by means of at least one inflatable member and the device of the invention for implementing it.

DETAILED DESCRIPTION OF THE PREFERRED EMBODIMENTS

The vehicles can be disposed face-to-face, for example, at least one of the two vehicles traveling towards the other vehicle. The vehicles can also be traveling one behind the other, the following vehicle traveling at a higher speed than the preceding vehicle.

In all cases at least one of the vehicles includes an inflatable member adapted to be deployed between the vehicles.

The gas generators needed for opening the inflatable members are not shown in FIGS. 1A through 1E.

The inflatable members are disposed on the vehicles in a folded condition.

The location of the inflatable members depend on the areas of the vehicle to be protected.

In a first particular embodiment of the method of the invention of protection against impacts between two vehicles by means of at least one inflatable member shown in FIGS. 1A through 1E each of the vehicles includes an inflatable member both of which are adapted to be deployed between the vehicles.

In this first particular embodiment of the method of the invention transmit/receive beacons are disposed on at least one of the vehicles.

The gas generator receives the command to release the gas that it contains when the associated transmit/receive beacon transmits a signal commanding opening of the inflatable member.

The method of the invention of protection against impacts between two vehicles by means of at least one inflatable member will be described by means of the succession of situations represented in FIGS. 1A through 1E.

Figure 1A:
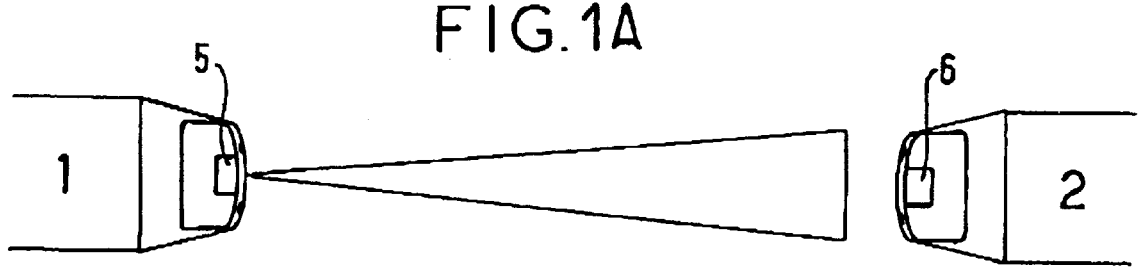
FIGS. 1A through 1E show a first vehicle 1 and a second vehicle 2, for example railroad vehicles, traveling on the same track.

In FIG. 1A the vehicles are in a relative position in which there is no risk of collision.

The transmit/receive beacon 5 associated with the first vehicle 1 does not detect the second vehicle 2.

Figure 1B:
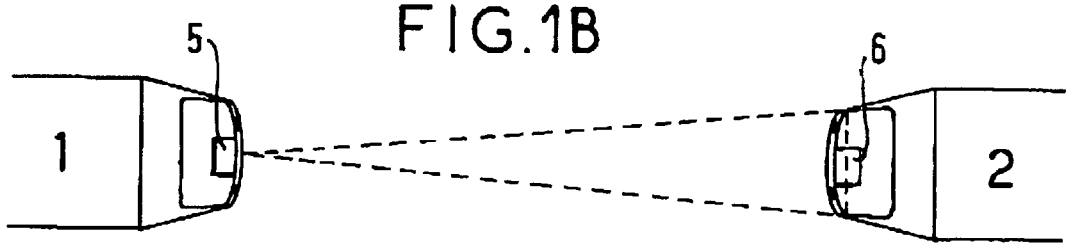

In FIG. 1B the transmit/receive beacon associated with the first vehicle 1 detects that the first vehicle 1 is going to collide with the second vehicle 2.

Figure 1C:
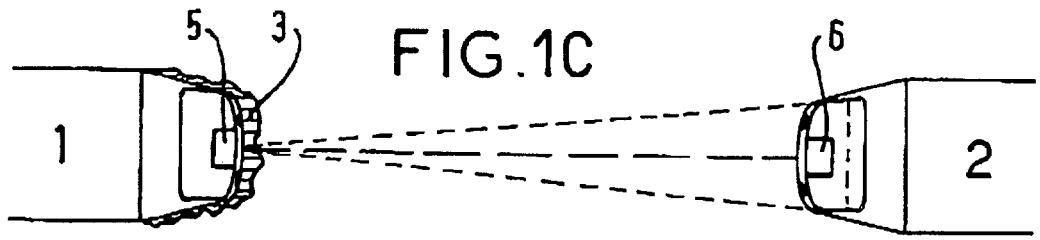

The transmit/receive beacon 5 associated with the first vehicle 1 transmits a signal commanding opening of the first inflatable member 3 (FIG. 1C).

Figure 1D:
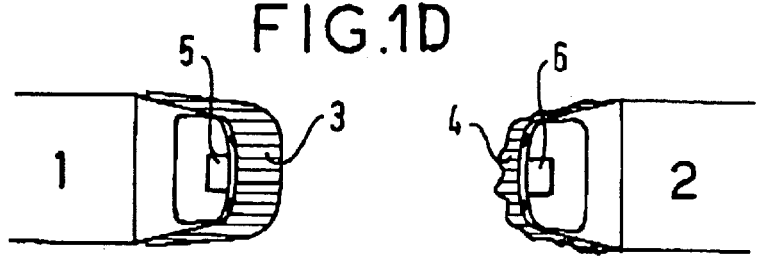
Figure 1E:
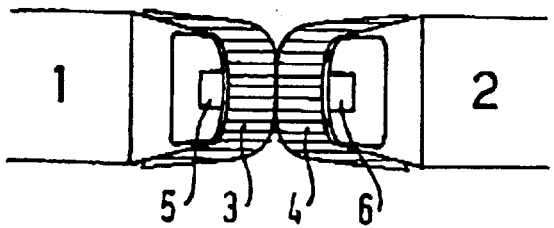

The receive beacon 6 associated with the second vehicle 2 receives the signal commanding opening of the first inflatable member 3 and transmits a signal commanding opening of the second inflatable member 4 (FIG. 1D).

It should be understood that each transmit/receive beacon 5, 6 comprises an obstacle detector system, for example of the infrared or Doppler or like type, and another communication system adapted to transmit a signal commanding opening of an inflatable member to another remote beacon and to receive a command signal of this kind transmitted from another remote beacon. The latter communication system can be a microwave or other type radio communication system, for example. This communication must be directional, i.e. it must be established between the two vehicles liable to collide (for example two railroad vehicles traveling on a first track) and not interfere with the protection system of a third vehicle in the vicinity of these two vehicles (for example a third railroad vehicle moving on a track parallel to the first track and passing the other two railroad vehicles). In the case of a radio communication system directionality could be achieved by orienting the antennas of the communication systems along the axis of the track on which the vehicle is traveling and by limiting the range of the radio link in an appropriate manner, for example. In the railroad application, the radio communication systems could be replaced by a system of communication via the rails of the track of via the automatic control strip.

The collision between the two vehicles is therefore damped because the two inflatable members open before the impact.

Other particular embodiments of the method of the invention of protection against impacts between two vehicles by means of at least one inflatable member are possible.

EXAMPLE 1

Each vehicle 1, 2 has a transmit/receive beacon 5, 6.

Example 2 corresponds to the preceding example in which the method applies to each of the vehicles.

The inflatable members open as soon as one of the transmit/receive beacons first receives the signal commanding opening of the inflatable member transmitted by the other transmit/receive beacon.

EXAMPLE 2

Each vehicle 1, 2 has a transmit/receive beacon 5, 6.

Each of the transmit/receive beacons associated with the vehicles detects that the other vehicle is going to collide with it.

Each of the transmit/receive beacons associated with the vehicles transmits a signal commanding opening of the associate inflatable members.

The materials of the inflatable members used in the method of the invention of protection against impact between two vehicles and the pressure employed procure:

great strength because the colliding vehicles generate high levels of energy, conservation of the absorption capacity of the inflatable members for a relatively long period, approximately 10 seconds, because it is practically impossible to define in any simple way the time that will elapse between closing of at least one inflatable member and the collision.

The method of the invention of protection against impacts between two vehicles can be used regardless of the position of the inflatable members around the vehicle.

A transmit/receive beacon can trigger an inflatable member according to the direction in which it receives the signal commanding opening of the inflatable member transmitted by another transmit/receive beacon.

Clearly the transmit/receive beacons can be switched off or even removed, the driver of the vehicle then being able to trigger opening of the inflatable members manually.

This results in a device for implementing the method of protection against impact between two vehicles 1, 2 by means of an inflatable member 5, 6 in which the first vehicle 1 includes a transmit/receive beacon 5 and the second vehicle 2 includes a receive beacon 6.

In the device for implementing the method of protection against impacts between two vehicles 1, 2 by means of an inflatable member 5, 6 to which examples 1 and 2 relate each vehicle 1, 2 includes a transmit/receive beacon 5.

What is claimed is:

1. A method of protection against impacts between two vehicles by means of an inflatable member, in which each of the vehicles includes an external inflatable member adapted to be deployed under control of a signal commanding opening of said inflatable member, said method comprising the steps of:

detecting from a first of said two vehicles an impending collision of said two vehicles, transmitting from said first of said two vehicles a first signal commanding opening of said inflatable member associated with said first vehicle;

receiving said first signal commanding opening of said inflatable member associated with said first vehicle, by said second of said two vehicles, and transmitting to said second vehicle a second signal commanding opening of said inflatable member associated with said second vehicle.

2. The method according to claim 1, further comprising the steps of:

detecting from said second vehicle the impending collision of said two vehicles, transmitting from said second vehicle said second signal commanding opening of said inflatable member associated with said second vehicle;

receiving said second signal commanding opening of said inflatable member associated with said second vehicle, by said first vehicle, and transmitting to said first vehicle said first signal commanding opening of said inflatable member associated with said first vehicle.

3. The method according to claim 1, wherein a driver of one of the vehicles initiates the transmitting step.

4. The method according to claim 1, wherein the transmitting and receiving steps are performed using transmit/receive beacons disposed on said vehicles.

5. The method according to claim 1, wherein a transmit/receive beacon triggers an inflatable member associated with one of said two vehicles according to a direction in which said transmit/receive beacon receives the signal commanding opening of the inflatable member associated with the other one of said two vehicles, transmitted by another transmit/receive beacon.

6. A device for implementing the method of protection against impacts between two vehicles by means of an inflatable member associated with one of said two vehicles according to claim 1, wherein said first vehicle includes a transmit/receive beacon and said second vehicle includes a receive beacon.

7. A device for implementing the method of protection against impacts between two vehicles by means of an inflatable member associated with one of said two vehicles according to claim 2, wherein each of said two vehicles includes a transmit/receive beacon.

* * * * *